Patented Feb. 3, 1942

2,271,804

UNITED STATES PATENT OFFICE 2,271,804

SOLUBILIZED GEL AND PROCESS OF MAKING SAME

Frank B. Root, West Orange, N. J., assignor to Ellis-Foster Company, a corporation of New Jersey No Drawing. Application September 1, 1938, Serial No. 227,968

8 Claims. (Cl. 260—18)

This invention relates to a process of treating insoluble heat-gelled drying oil-resin compositions whereby they become soluble in varnish thinners and can be used for the preparation of coating compositions and the like.

In the usual method of varnish-making a drying oil is incorporated with an oil-soluble resin and the mixture is heated until it has such viscosity characteristics that when thinned it forms a solution which is capable of being applied to a surface. The heating of the oil and resin must be stopped at a predetermined point, since if continued further there is obtained, first, a soft gel which disperses to form a solution of such high viscosity as to prevent application as a varnish and, ultimately, an insoluble unusable solid gel. On the other hand, in the heat-treatment of the oil and resin, the longer the heating is carried on, the faster is the drying of the resulting varnish, which indicates that, in the gel state, the composition has maximum drying rate. However, since practical considerations require that the heating be stopped at a predetermined point where the drying oil-resin composition is still soluble (sol-stage), the maximum drying rate of the varnish is never attained by the usual procedure. The process outlined below is intended to be a method whereby the most rapid drying of an oil can be realized.

The present invention depends on the fact that an insoluble drying oil-resin gel can be rendered soluble again by a mechanical treatment involving mastication. The nature of the action is not known but presumably it involves rupture of certain secondary linkages which are responsible for the insoluble state of the gel and converts the gel into a simpler soluble form. Since the gel is preferably dissolved soon after the mastication treatment and thereby converted into a varnish, the secondary linkages are prevented from re-forming by the interpolation and diluting action of the solvent but are readily susceptible to the action of oxygen when the solvent is removed as in the drying of a varnish film.

The process, therefore, consists in heating the oil-resin composition to a point beyond the sol-gel transformation point (where it is a solid gel) and rendering the insoluble gel thus obtained soluble again by mastication. Although mastication with heating is widely used with rubber to soften it, to compound it with fillers or to lower its viscosity in solution, and has also been proposed for solubilizing fossil resins such as Congo copal, it has not been used heretofore with such dissimilar products as heat-gelled drying oil compositions.

Drying oils such as tung, oiticica and dehydrated castor oil are highly susceptible to gelation. However, oils of the predominantly linoleic type such as linseed, perilla and soya bean form compositions which gel when heated for a sufficiently long time.

Resins to mix with drying oils prior to gelation include natural resins and their esters and resinates such as rosin, ester gum, copals, copal esters and limed rosin; also synthetic varnish resins such as oil-soluble phenol-aldehyde resins, rosin-phenol-aldehyde, polycoumarone, polybasic acid-modified rosin esters (e. g., rosin-maleic-glyceride) and oil-soluble diolefin polymers (e. g., aluminum chloride-polymerized constituents of vapor-phase-cracked petroleum). It is probable that in most cases the gels obtained from a resin and drying oil involve a degree of chemical action with formation of a reaction-complex containing the drying oil acid radicals and resin in combination. Hence, another type of gel included herein is that from a composition in which drying oils or drying oil acids are combined in a synthetic resin to form oil-modified resins. All drying oils appear to form easily gelled complexes when they, or their fatty acids, are reacted into alkyd resins or phenol-aldehyde condensation products. The varnish-base compositions of the present invention, therefore, comprise not only oil-resin products of the conventional type but also resins or resin-complexes, the molecules of which have incorporated therein the radicals of the drying oil fatty acids. All are intended to be included in the term drying oil-resin compositions.

Gelation is accomplished by heating the drying oil-resin composition and for gelation within a practical period the temperature is from about 240° to about 300° C. The heating may be accompanied by simultaneous or intermittent blowing in of air, in which case a shorter time or lower temperature is possible to form the gel. A lower temperature is also permissible when a mixture such as tung oil and a phenol-aldehyde resin is heated in the presence of a condensing agent such as oxalic acid.

Mastication can be done with any machine which exerts a definite tearing action such as milling rolls, pressure mixers of the Banbury type or kneaders such as dough mixers. Heat is not necessary except as a matter of expedience; that is, solubilization occurs more rapidly and less power is necessary if the action is conducted under the moderate temperatures which are attainable with such mixing machinery. For pigmented compositions the dry pigment may be incorporated during mastication. Also, with mixers of the closed type the gel may be thinned in the machine as soon as mastication has produced proper solubility, thus avoiding transfer of the tough, difficultly handled composition. Driers are added by cooking into the original composition or as solutions when the varnish is thinned.

Varnish bases of long oil-length are in general more quickly gelled than those of short length. Also, some resins, such as rosin with tung oil, tend to retard gelation when present in relatively high proportion. Therefore, for short-oil bases such as those for furniture varnishes, it is preferable to use a composition of medium length (say, 18 to 30 gallons) and incorporate the gel therefrom with additional resin, preferably a resin which does not depend on any reaction with the oil to make it soluble, etc. The added resin in this case may be incorporated either during mastication of the gel or by mixing a solution thereof with a solution of the solubilized gel.

One aspect of the invention involves the preparation of a solubilized gel which dries from solution as a firm film requiring no oxidation for initial hardening. Thus, the varnish dries like a lacquer initially and presents a film hard enough to withstand handling as soon as the major portion of the solvent has disappeared. Subsequent oxidation serves to harden the film further and permit operations such as rubbing and polishing. This later oxidation-hardening occurs rapidly since only a relatively small amount of oxidation is necessary to reform and carry forward the original solid gel-structure. Thinners of higer volatility than generally used in varnishes (toluol and xylol, petroleum hydrocarbon cuts of boiling range approximating these coal-tar solvents, and aromatics-containing hydrogenated petroleum naphthas of analogous boiling range) hasten the initial dry. Application may be by spray gun or brush as desired or required. The hard initial dry of the film may be improved by incorporation of such film-forming substances as ethyl cellulose and chlorinated rubber, provided a resin is chosen which is compatible therewith. Also by proper adjustment of solvents (lacquer type) and resins, the solubilized gels may be incorporated with nitrocellulose in lacquers.

The following examples are given to illustrate the invention.

*Example 1.*—One part of ester gum and 1½ parts by weight of tung oil were heated to 280° C. and held at this temperature for about an hour or until an insoluble gel was formed. The gel was placed in a Banbury mixer and masticated for an hour during which time it became freely soluble in xylol. A varnish was made by dissolving 2 parts of the gel in 3 parts of xylol and adding a lead-cobalt naphthenate solution equivalent to 0.2% Pb and 0.02% Co, based on the solids. The varnish dried within 3 hours.

A short-oil varnish was made by mixing a portion of the varnish with a solution of a rosin-maleic-glycerol ester (Rauzene X-145) to give equal parts of dissolved gel and resin. The varnish thus obtained dried in less than an hour.

*Example 2.*—One part of a heat-reactive oil-soluble phenolic resin (Bakelite 3360) and 1½ parts linseed oil were heated to 280-290° C. and heating was continued for about an hour. The gel which formed was insoluble in xylene. After the gel had been masticated in a Banbury mixer for a short time it was freely soluble in xylene and a varnish consisting of a 40% solution in xylene to which a normal amount of driers was added dried within 2 hours.

*Example 3.*—Another drying oil-resin composition was made similar to that of Example 2 except that heating was conducted at about 235° C. to permit longer heating. Samples were removed at intervals during heating and dissolved to form varnishes. The final gel was milled for 15 minutes on mixing rolls and dissolved to form a varnish. The varnish prepared from the solubilized gel showed a shorter drying time than those from the ungelled compositions.

*Example 4.*—A gel was formed by heating a mixture of 1 part tung oil and 1½ parts of a cresol-acetaldehyde resin with 6% of oxalic acid for about an hour at 190-200° C. The insoluble gel was placed in a Banbury mixer with titanium dioxide pigment (2 parts gel to 1 part pigment) and masticated until the gel was solubilized and the pigment dispersed. A xylol solution of the product to which the requisite amount of driers was added formed a quick-drying enamel.

*Example 5.*—A mixture of 200 parts tung oil, 30 parts resorcinol and 4 parts oxalic acid was heated to 120° C. and held at this temperature for about an hour or until an insoluble gel formed. The gelatinized composition was masticated on mixing rolls for about 20 minutes after which it was found to be soluble in mineral spirits.

*Example 6.*—One part coumarone resin and 2 parts tung oil were heated at 280-290° C. and allowed to gel. During the entire heating air was blown through the solution. The gel was solubilized on mixing rolls by milling for about ¾ hour. A varnish made from the solubilized gel dried in 4 hours.

*Example 7.*—A mixture consisting of 285 parts phthalic anhydride, 138 parts glycerol and 180 parts linseed oil acids was heated at about 260° C. until an insoluble gel had formed. After working on differential rolls for a half hour the gel was soluble in xylol and formed a fast drying varnish.

*Example 8.*—Another drying oil-resin composition was made by heating 184 parts glycerol, 280 parts linseed oil acids and 280 parts tung oil acids at 250° C. until a homogeneous solution was formed and then adding 370 parts phthalic anhydride. Heating was continued at 250° C. and samples were removed at intervals and made into varnishes. A sample removed about 15 minutes before final gelation was insoluble in a mixture of xylol and butanol and was solubilized by milling for 10 minutes on mixing rolls. The final gel required 15 minutes of milling in order to become soluble. Comparison of the varnishes made from the series of samples showed that those of short heating were relatively slow drying and produced the crystalline effect which is characteristic of tung oil varnishes which have not been sufficiently heated. Samples removed immediately prior to the formation of the infusible gel as well as the varnish prepared from the final gel which had been solubilized by mastication treatment dried smooth.

The above examples illustrate the solubilization of gels which are infusible at the temperature at which they are prepared. However, the drying oil-resin mixture before becoming infusible is a rubber-like gel when cold and, as mentioned previously, its solubility decreases the further the heating is continued. That is, in the first period of heating of a drying oil composition, it thins with a given amount of solvent to a varnish of low viscosity; as heating is continued the composition yields solutions of higher and higher viscosity; and, eventually a stage is reached where a solution may be obtained but it is either of such high viscosity as to require undue thinning to be workable or it is of a stringy or soft jelly-like nature which prevents its application by normal means. The final stage is, as illustrated in the above examples, where the gel is insoluble or merely swells in contact with thinners.

It has been found that mastication of a varnish base in the above mentioned fusible gel stages produces a composition whose solution is of lowered viscosity and yields a usable varnish in the case of those heat-treated varnish compositions which do not reduce to a workable condition. For example, a sample of the varnish base of Example 1 removed after 50 minutes of heating at 280° C. was liquid when hot, rubber-like when cold and insoluble in mineral spirits. Mastication on mixing rolls for 15 minutes served to solubilize it in mineral spirits. Another feature of the invention, therefore, is the alteration of solubility characteristics of varnish bases so that they yield varnishes of desired viscosity.

In making tung oil varnishes which are to be gas-proof, it is essential that the oil get adequate heat-treatment. With resins that do not check polymerization of the oil, it is often difficult to get gas-proofness without the oil-resin mixture becoming unduly bodied. The present invention permits heating well beyond the point where resistance to frosting results and then, if necessary, bringing the base to proper viscosity by mastication. Long heating also tends to increase alkali resistance. Furthermore, the invention may be used for the recovery of batches of oil varnishes and alkyd resins which have gelled through error and which would normally be wasted or used for a purpose other than intended.

What I claim is:

1. A process for solubilizing an insoluble heat-gelled drying oil-resin composition, which comprises subjecting said gel to mastication treatment, whereby it is rendered soluble in varnish thinners.

2. A process for solubilizing an insoluble heat-gelled drying oil-natural resin composition, which comprises subjecting said gel to mastication treatment, whereby it is rendered soluble in varnish thinners.

3. A process for solubilizing an insoluble heat-gelled drying oil-modified alkyd resin, which comprises subjecting said gel to mastication treatment, whereby it is rendered soluble in varnish thinners.

4. A process for solubilizing an insoluble heat-gelled drying oil-phenol-aldehyde composition, which comprises subjecting said gel to mastication treatment, whereby it is rendered soluble in varnish thinners.

5. A solubilized gel adapted for solution to form a varnish, comprising a masticated heat-gelled drying oil-resin composition, said composition before mastication being insoluble in varnish thinners.

6. A solubilized gel adapted for solution to form a varnish, comprising a masticated heat-gelled drying oil-natural resin composition, said composition before mastication being insoluble in varnish thinners.

7. A solubilized gel adapted for solution to form a varnish, comprising a masticated heat-gelled drying oil-modified alkyd resin, said composition before mastication being insoluble in varnish thinners.

8. A solubilized gel adapted for solution to form a varnish, comprising a masticated heat-gelled drying oil-phenol-aldehyde composition, said composition before mastication being insoluble in varnish thinners.

FRANK B. ROOT.